(12) United States Patent
Watanabe

(10) Patent No.: US 8,277,961 B2
(45) Date of Patent: Oct. 2, 2012

(54) MAGNETIC RECORDING MEDIUM

(75) Inventor: Sadayuki Watanabe, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 667 days.

(21) Appl. No.: 12/234,608

(22) Filed: Sep. 19, 2008

(65) Prior Publication Data

US 2009/0081484 A1    Mar. 26, 2009

(30) Foreign Application Priority Data

Sep. 21, 2007  (JP) ................... 2007-245760

(51) Int. Cl.
*G11B 5/66* (2006.01)
(52) U.S. Cl. ........................................ 428/828
(58) Field of Classification Search .......... 428/827, 428/828, 828.1, 829
See application file for complete search history.

(56) References Cited

U.S. PATENT DOCUMENTS

| | | | | |
|---|---|---|---|---|
| 6,183,893 | B1* | 2/2001 | Futamoto et al. | 428/831.2 |
| 2001/0051287 | A1* | 12/2001 | Kikitsu et al. | 428/694 ML |
| 2006/0228586 | A1* | 10/2006 | Girt et al. | 428/828 |
| 2007/0212574 | A1* | 9/2007 | Berger et al. | 428/828 |

FOREIGN PATENT DOCUMENTS

| | | |
|---|---|---|
| JP | 2005-310368 A | 11/2005 |
| JP | 2005-332474 A | 12/2005 |
| JP | 2007-220177 A | 8/2007 |

OTHER PUBLICATIONS

J. Magn. Soc. Jpn., 31, 178-183 (2007).*
Igarashi et al.; "Computer Simulation for Thermal Assist Recording"; Technical Report of IEICE; MR2004-39 (2004); pp. 1-6; Tokyo Japan. English abstract provided.
Shimatsu et al.; "Magnetic Properties of Hard/Soft-Stacked Perpendicular Media Having Very Thin Soft Layers With a High Saturation Magnetization"; Journal of the Magnetics Society of Japan; vol. 31, No. 3, 2007; pp. 178-183; Japan. English abstract provided.
First office action issued in corresponding Chinese application No: 200810149274.1, dated Feb. 24, 2011. Partial translation provided.
Notification of Reasons for Refusal for corresponding JP 2008-230448, mail date Mar. 27, 2012. Partial translations provided.

* cited by examiner

*Primary Examiner* — Holly Rickman
*Assistant Examiner* — Lisa Chau
(74) *Attorney, Agent, or Firm* — Rossi, Kimms & McDowell LLP

(57) ABSTRACT

A magnetic recording medium for thermally assisted recording is disclosed which achieves both high density writing and good control of temperature characteristics. The magnetic recording medium for thermally assisted recording comprises an underlayer, a magnetic recording layer, and a protective layer sequentially laminated on a nonmagnetic substrate. The magnetic recording layer has a structure composed of two magnetic layers and an exchange coupling control layer inserted between the magnetic layers, the two magnetic layers being magnetically coupled through the exchange coupling control layer. The coupling energy Jw in the process of writing a signal and the coupling energy Jr in the state of retaining a signal satisfy a relation 0<Jw<Jr.

3 Claims, 2 Drawing Sheets

MAGNETIC RECORDING MEDIUM

BACKGROUND OF THE INVENTION

A. Field of the Invention

The present invention relates to magnetic recording media installed in various types of magnetic recording devices.

B. Description of the Related Art

"Perpendicular magnetic recording systems" were put to practical application recently as a technology to achieve high recording density in magnetic recording. This system, in which recording magnetization is perpendicular to the plane of the recording medium, is taking the place of the conventional longitudinal magnetic recording system, in which the recording magnetization is parallel to the plane of the recording medium. A perpendicular magnetic recording medium (hereinafter abbreviated as a perpendicular medium) used in perpendicular magnetic recording is principally composed of a magnetic recording layer of a hard magnetic material, an underlayer for aligning the recording magnetization of the magnetic recording layer in the perpendicular direction, a protective layer for protecting the surface of the magnetic recording layer, and a backing layer of a soft magnetic material for concentrating a magnetic flux generated by the magnetic head that is used for recording on the recording layer.

It is one of guidelines in medium design for high recording density that magnetic separation between magnetic grains composing the magnetic recording layer should be enhanced in order to minimize a magnetization reversal unit. Since the thickness of the magnetic recording layer is basically uniform in the direction over the medium surface, reduction of the magnetization reversal unit means a decrease in a cross sectional area of the magnetization reversal unit while maintaining the height. As a result, a demagnetizing field acting thereon decreases while increasing a reversing magnetic field. Thus, regarding the configuration of the magnetization reversal unit, enhancement of recording density needs a larger write magnetic field.

On the other hand, it is known that an energy value $K_u V$ of a grain needs to be sufficiently large relative to thermal energy $kT$ in order to secure long term stability of recorded signals. Here, k is the Boltzmann constant; T, an absolute temperature; $K_u$, a crystalline magnetic anisotropy constant; and V, an activation volume. A decrease in size of the magnetization reversal unit as mentioned above means a decrease in V, which affects signal instability, creating a problem of so-called "thermal fluctuation." In order to avoid this phenomenon, the $K_u$ value must be increased, which also brings an increase in write magnetic field since the $K_u$ value is in proportional relationship with the reversing magnetic field.

To cope with this problem, a technique has been proposed in which a structure includes two magnetic layers, and an exchange coupling energy between the layers is reduced to decrease the reversing magnetic field without deteriorating thermal stability. This type of medium is called an exchange coupling controlled medium. Japanese Unexamined Patent Application Publication No. 2005-310368, for example, discloses that the reversing magnetic field decreases with weakening of the exchange coupling energy from a condition of direct lamination of two magnetic layers at which the exchange coupling energy is infinitely large, takes the minimum value at the optimum coupling energy, and increases with a decrease towards zero in the coupling energy. This phenomenon is caused by non-simultaneous magnetization reversal processes, namely incoherent magnetization reversal processes, of the two magnetic layers while maintaining weak coupling between the two layers. Consequently, the optimum value of the coupling energy and consequently, a reduction rate of the reversing magnetic field, varies depending on physical properties such as saturation magnetization Ms and the $K_u$ value of the upper and lower magnetic layers. For practical purposes, a coupling energy control layer is provided to change the coupling energy and optimize the physical properties of the upper and lower magnetic layers.

Another approach to the problem of write performance has been proposed which is a recording method called thermally assisted recording, in which a combination with a magnetic head is taken into consideration. This method utilizes a characteristic of magnetic materials, a temperature dependence of the $K_u$, which decreases with increase in temperature. A write process in this method is conducted during temporary decrease in the $K_u$ value attained by heating the magnetic recording layer to reduce the reversing magnetic field. After the temperature has returned or decreased, the $K_u$ value restores the original high value, so the recording signals are safely retained. When this new recording method is envisaged, design of a magnetic recording layer must consider temperature characteristics of the layer in addition to the conventional guideline. Technical Report of IECE, MR2004-39 (2004) discloses that the transition width of a recording bit is determined by a head magnetic field gradient and a temperature gradient. Since a large temperature change results in an increased difference in the $K_u$ value, the difference between a write stage and a retaining stage increases, giving a large resulting gain. Regarding this item, it is known that the reversing magnetic field varies linearly with temperature variation in CoPt alloy magnetic materials, which are mainly used in perpendicular media at present and classified into ferromagnetic materials. These magnetic materials are also known to exhibit relatively small variation in the temperature gradient due to the composition; giving values generally smaller than $-20$ Oe/$^\circ$ C. On the other hand, magnetic materials such as TbFeCo, for example, which are commonly used in magneto-optical recording media and classified into ferrimagnetic recording materials, exhibit large composition dependence of the temperature gradient of reversing magnetic field larger than $-100$ Oe/$^\circ$ C. by setting a compensation temperature at around the recording temperature. In addition to the material selection, there is a method for controlling overall temperature variation, which employs a lamination structure of plural layers of the ferromagnetic and ferrimagnetic materials and in particular, uses a ferrimagnetic or an equivalent material as a switching layer, to generate or eliminate the exchange coupling energy at a recording temperature. For, example, JP 2005-310368 proposes a variety of layer structures.

The exchange coupling controlled media use an existing CoPt alloy magnetic material and control the balance between the reversing magnetic field and the thermal stability by devising a combination of the compositions of the layers. There is a limit, however, due to restriction of material properties including the Ms and the $K_u$ values.

In thermally assisted recording, on the other hand, regarding an especially important issue of temperature variation control, conventional simple use of a CoPt alloy magnetic material hardly attains a temperature gradient of the reversing magnetic field over $-20$ Oe/$^\circ$ C. Use of a ferrimagnetic material, however, allows easy temperature control. When a transition metal/rare earth amorphous alloy material is used, however, the magnetization mechanism is so-called a type of magnetic domain wall movement and hard to fix magnetic domain walls, which are boundaries between bits. Fluctuation of the bit boundaries is undesirable from the view point of high density recording. Despite the need for narrowing widths of the magnetic domain walls in order to enhance recording density, it is difficult to reduce the width to a grain boundary width (about 1 nm), which is believed to be a boundary between bits in a micro grain system. Further, it is difficult to add a non-magnetic substance and to form a microscopic structure with magnetic grains surrounded by the non-magnetic substance, as seen in the CoPt alloy magnetic materials.

The studies by the inventor of the present invention have clarified that, in combination of the exchange coupling control medium with the thermally assisted recording, media with more weakened exchange coupling energy exhibit a smaller temperature gradient. This fact means that simple application of an exchange coupling medium to the thermally assisted recording results in very little difference in the reversing magnetic field at a heated state from the one at an unheated state, thus, the primary object of the thermally assisted recording method cannot be achieved. This has been attributed to little variation of the exchange coupling energy itself with variation of temperature, that is, to variation of the optimum value of the coupling energy depending on the material properties of the upper and lower magnetic layers that have been changed at the heated state.

As described above, conventional recording systems possibly achieve a breakthrough by means of thermally assisted recording to attain high recording density in magnetic recording devices. Nevertheless, such a medium applicable to this recording system is yet needed that provides compatibility between high density write process and temperature characteristics control.

The present invention is directed to overcoming or at least reducing the effects of one or more of the problems set forth above.

SUMMARY OF THE INVENTION

The present invention has been made in view of the problems described above, and an object of the invention is to provide a magnetic recording medium capable of high density recording to be used in magnetic recording devices that conduct processes of writing signals at higher temperatures than temperatures in a state of retaining signals.

A magnetic recording medium of the present invention is used in magnetic recording devices in which a process of writing a signal is conducted at a temperature higher than a temperature in a state retaining a signal, and comprises an underlayer, a magnetic recording layer, and a protective layer sequentially laminated on a nonmagnetic substrate; the magnetic recording layer including a structure having two magnetic layers and an exchange coupling control layer inserted between the magnetic layers; the two magnetic layers being magnetically coupled through the exchange coupling control layer; a coupling energy in the process of writing a signal and a coupling energy in the state of retaining a signal being different from each other; and the coupling energy Jw in the process of writing a signal and the coupling energy Jr in the state of retaining a signal satisfying a relation 0<Jw<Jr.

Preferably, the exchange coupling control layer of the magnetic recording layer of the magnetic recording medium contains a magnetic element(s), and a saturation magnetization of the exchange coupling control layer $M_{se}$, saturation magnetizations of the magnetic layers disposed on and beneath the exchange coupling control layer $M_{s1}$ and $M_{s2}$ in the process of writing a signal satisfy inequalities $M_{se}<M_{s1}$ and $M_{se}<M_{s2}$.

Preferably, each of the magnetic layers and the exchange coupling control layer of the magnetic recording layer of the magnetic recording medium includes a structure in which magnetic crystal grains are surrounded by a nonmagnetic substance.

Preferably, a crystalline magnetic anisotropy constant Ku of the exchange coupling control layer is at least $1.0 \times 10^6$ erg/cm$^3$.

Preferably, the exchange coupling control layer is composed of multilayered laminated layers of a film including a magnetic element(s) and a nonmagnetic material(s) of oxide or nitride added to the magnetic element, and a film of a nonmagnetic material.

The exchange coupling energy between the two magnetic layers is changed in the process of writing a signal and in the state of retaining a signal. In the state of retaining a signal, the coupling energy between the two layers is strong, and the reversing magnetic field is large. The exchange coupling energy diminishes in the process of writing a signal, i.e., at a high temperature, becoming an optimum exchange coupling energy corresponding to material properties of the magnetic layers in this process, thereby exhibiting an effect of reducing the reversing magnetic field. Since a large temperature change is obtained as compared with the case in which the exchange coupling energy hardly changes between the writing process and the retaining state, the invention is useful for the new recording system in which the process of writing a signal is conducted at a higher temperature than the temperature in the state of retaining a signal. By using an exchange coupling control layer in which the saturation magnetization is smaller than that of the upper and lower magnetic layers at least in the process of writing a signal, temperature variation of the exchange coupling energy increases. A material used in the exchange coupling control layer is not an amorphous material, but a material having a structure with magnetic crystal grains surrounded by a nonmagnetic substance. Thus, a medium suited for the new recording system is provided, achieving high density recording.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Some preferred embodiments of the invention will be described in the following with reference to the accompanying drawings.

Figure 1:
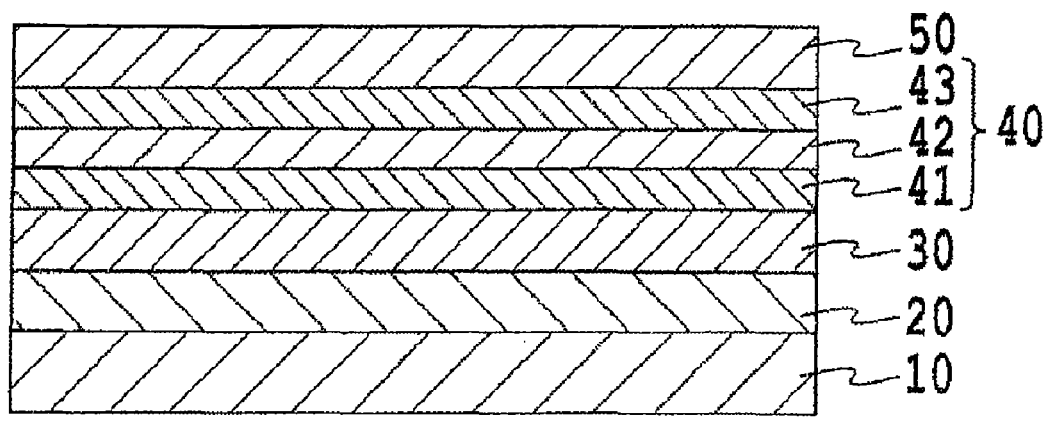
FIG. 1 is a schematic sectional view of a magnetic recording medium according to the invention.
Figure 2:
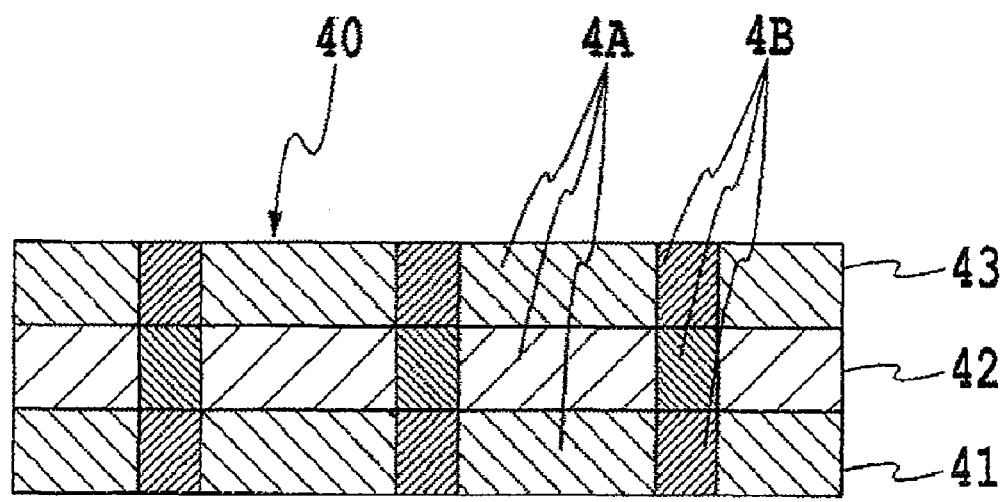
FIG. 2 is a schematic sectional view of a magnetic recording layer in a magnetic recording medium according to the invention.
Figure 3:
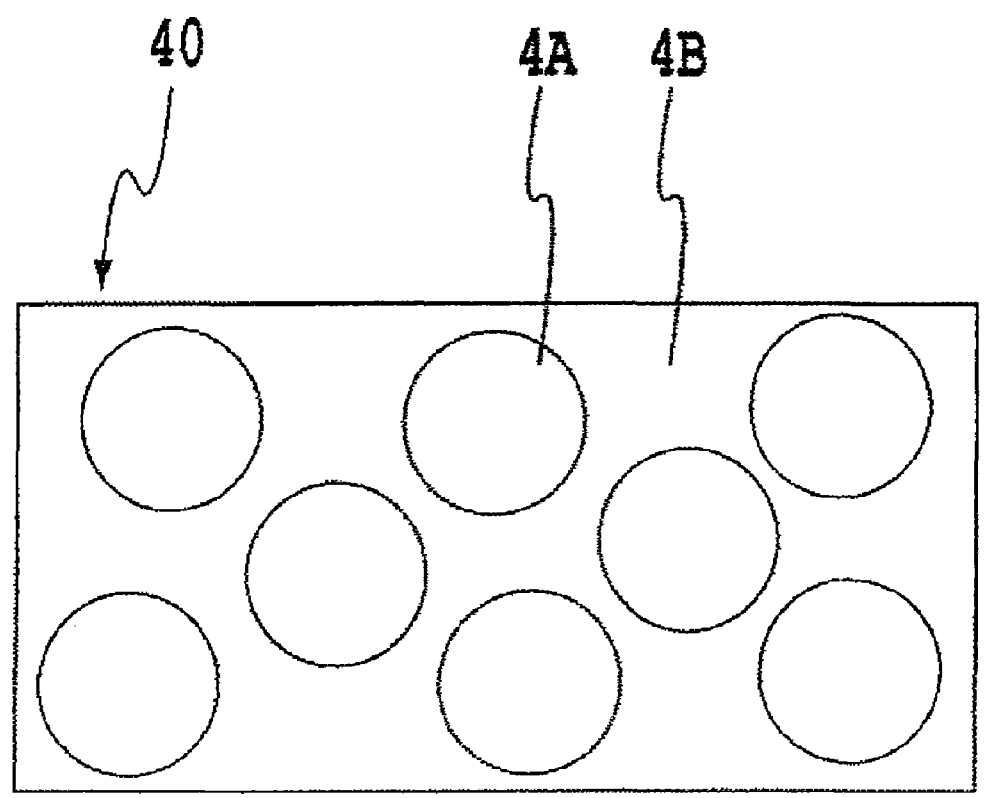
FIG. 3 is a schematic plan view of a magnetic recording layer in a magnetic recording medium according to the invention.

FIG. 1 illustrates an example of a structure of a magnetic recording medium of the invention and is a sectional view showing a structure having a soft magnetic backing layer. Referring to FIG. 1, a magnetic recording medium comprises non-magnetic substrate 10; and sequentially laminated layers of soft magnetic backing layer 20, underlayer 30, magnetic recording layer 40, and protective layer 50 on non-magnetic substrate 10. A lubricant layer can be further formed on protective layer 50. A structure without soft magnetic backing layer 20 also is possible. The present invention features magnetic recording layer 40 that includes a structure composed of magnetic layer 41, magnetic layer 43, and exchange coupling control layer 42. Each of magnetic layer 41, magnetic layer 43, and exchange coupling control layer 42 preferably has a structure with magnetic crystal grains surrounded by a non-magnetic substance. FIG. 2 and FIG. 3 illustrate an example of structure of magnetic recording layer 40 in the invention, showing a structure of a magnetic recording layer composed of three layers of magnetic layer 41, magnetic layer 43, and exchange coupling control layer 42. FIG. 2 is a sectional view and FIG. 3 is a plan view. As shown in FIG. 2 and FIG. 3, magnetic portions 4A, which are preferably magnetic crystal grains, can be located at the same positions in each of the three layers; and non-magnetic portions 4B, which are non-magnetic substances present between the crystal grains, can be located at the same position in each of the three layers. The resulting structure has columns of magnetic portions grown through each of the three layers from the underlayer. In this structure, the magnetic portions of the upper and lower magnetic layers couple through the exchange coupling control layer, and the columns of the magnetic portions are separated from each other by the non-magnetic substance, forming independent magnetization reversal units.

The following describes an embodiment of the present invention referring to FIG. 1.

Non-magnetic substrate 10 useful in a magnetic recording medium of the invention can be selected from a NiP-plated aluminum alloy, strengthened glass, and crystallized glass that are used in ordinary magnetic recording media. When the substrate temperature is held within about 100° C. in the process of film deposition and in the process of recording, a plastic substrate composed of a resin of polycarbonate, polyolefin, or the like can also be used. A silicon substrate can be used, too.

Soft magnetic backing layer 20 is preferably formed for controlling a magnetic flux generated by a magnetic head to improve read-write performance as in the existing perpendicular magnetic recording system. This layer can be omitted. Materials useful in soft magnetic backing layer 20 include crystalline alloys of a NiFe alloy, a sendust alloy (FeSiAl), and a CoFe alloy; and micro crystalline materials of FeTaC, CoFeNi, and CoNiP. In order to improve recording performance, soft magnetic hacking layer 20 preferably has a large saturation magnetization. The optimum value of a film thickness of soft magnetic backing layer 20 varies depending on the structure and characteristics of the magnetic head used for magnetic recording and preferably in the range of 10 nm to 500 nm in view of the balance with productivity in the case of forming by continuous deposition with other layers. Film deposition can be carried out by a sputtering method as usual, and also by a plating method. A relatively large film thickness of soft magnetic backing layer 20 may cause formation of magnetic domain walls, and fluctuation of magnetization near the recording layer, generating a perpendicular component of magnetization and making noises. In order to suppress this phenomenon, soft magnetic backing layer 20 is preferably made into a single magnetic domain structure by providing an antiferromagnetic layer or a hard magnetic layer. The additional layer can be disposed directly on the soft magnetic backing layer, directly beneath the backing layer, or in between the backing layers. Lamination of both layers is possible, too. Another possible structure is a lamination of the soft magnetic backing layer with a nonmagnetic layer. A perpendicular component of magnetization can also be suppressed by controlling a thickness of a nonmagnetic layer and utilizing antiferromagnetic coupling through the nonmagnetic layer.

Underlayer 30 is used for the purposes of (1) controlling crystal grain diameters and crystal alignment of materials of the recording layer over the underlayer, and (2) avoiding magnetic coupling between soft magnetic backing layer 20 and magnetic recording layer 40. Consequently, the underlayer is favorably nonmagnetic and the crystal structure of the underlayer needs to be appropriately selected corresponding to the material of the magnetic recording layer over the underlayer. However, an amorphous structure can be used, too. When a magnetic layer directly on the underlayer uses a magnetic recording layer material principally composed of cobalt with the hexagonal closest packed (hcp) structure, for example, preferably used materials for underlayer 30 have the same hcp structure or the face centered cubic (fcc) structure. Preferably used specific materials include Ru, Re, Rh, Pt, Pd, Ir, Ni, Co, and an alloy containing these elements. As for the film thickness, although a thinner layer results in improved ease of writing, a certain appropriate thickness is required in view of the above mentioned objects (1) and (2), and a preferable thickness is in the range of 3 to 30 nm.

Magnetic recording layer 40 includes a structure formed of two magnetic layers (41, 43) and an exchange coupling control layer 42. In order to bring about the effects of the invention, two magnetic layers (41, 43) are magnetically coupled through exchange coupling control layer 42, and a coupling energy Jw at the process of writing a signal and a coupling energy Jr in a state of retaining a signal satisfy the relation 0<Jw<Jr. Preferably, exchange coupling control layer 42 contains a magnetic element, and the saturation magnetizations $M_{se}$, $M_{s1}$, and $M_{s2}$ satisfy the inequalities $M_{se}<M_{s1}$ and $M_{se}<M_{s2}$, wherein $M_{se}$ represents a saturation magnetization of exchange coupling control layer 42 at the process of writing a signal, and $M_{s1}$ and $M_{s2}$ represent saturation magnetizations of the magnetic layers (41, 43) disposed under and on the exchange coupling control layer, respectively. The magnetic layers (41, 43) and exchange coupling control layer 42 preferably have a structure in which magnetic portion 4A is composed of a magnetic crystal grain and surrounded by nonmagnetic portion 4B of a nonmagnetic substance.

A material of the magnetic layers (41, 43) is preferably selected from commonly used crystalline magnetic layer materials. In a preferred structure, columnar crystal grains having a diameter of several nm and mainly composed of a magnetic element such as Co, Fe, or Ni are separated by a nonmagnetic substance having a thickness below 1 nm. Preferably used materials for the magnetic crystal grains can be a CoPt alloy with an additive metal of Cr, B, Ta, or W, and materials for the nonmagnetic substance preferably contains oxides or nitrides of Si, Cr, Co, Ti, or Ta, for example. A film deposition method can be a magnetron sputtering method, for example. In a preferred structure, the magnetic crystal grain, magnetic portion 4A, epitaxially grows on a crystal grain of underlayer 30, and the nonmagnetic substance, nonmagnetic portion 4B, locates on the grain boundary of underlayer 30, thus, crystal growth in a one-to-one corresponding manner is favorably performed. At least one of the magnetic layers (41, 43) included in magnetic recording layer 40 is preferably composed of a material exhibiting a large crystalline magnetic anisotropy constant: at least $5.0 \times 10^6$ erg/cm$^3$, more preferably, at least $1.0 \times 10^7$ erg/cm$^3$. A thickness of the magnetic layers is preferably at most 20 nm, more preferably, at most 10 nm.

A material useful for exchange coupling control layer 42 can be an alloy containing one of Co, Fe, and Ni, and a nonmagnetic metal. When the magnetic crystal grains in the magnetic layers (41, 43) disposed on and under exchange coupling control layer 42 are crystal grains with the hcp structure, the material of the exchange coupling control layer preferably has the same hcp structure or the fcc structure. In order to obtain good crystal alignment, the contained nonmagnetic metal element is preferably Cr, Pt, Pd, Ru, W, or Ta. Useful materials for the exchange coupling control layer include NiCr, NiPt, NiPd, CoPd, CoPt, and NiCoPt, for example. As for the magnetic layers (41, 43), a preferable material for the exchange coupling control layer contains an additive of oxide or nitride of Si, Cr, Co, Ti, or Ta. A favorably used material that exhibits the equivalent property to the above mentioned materials is a multilayer laminated film of a material composed of Co or Ni and an additive of nonmagnetic oxide or nitride, and a nonmagnetic material. Examples of such multilayer laminated film include a structure having several repeated laminations each composed of a Co—$TiO_2$ film and a Pd film, and a structure having repeated laminations each composed of a Ni—$SiO_2$ film and a Pt film. Because of the properties required by the exchange coupling control layer, a thickness of each layer composing the multilayer laminated film needs to be at most 2.0 nm, more preferably at most 1.0 nm. The saturation magnetization is necessarily smaller than those of the magnetic layers (41, 43) at least in the process of writing a signal, as mentioned previously. That is, the magnetization of exchange coupling control layer 42 itself necessarily little affects the amount of magnetization and magnetic anisotropy of magnetic recording layer 40 as a whole in the process of writing a signal, and works to weaken the exchange coupling between the upper and lower magnetic layers. If the saturation magnetization is large, the properties of exchange coupling control layer 42 have adverse effects, principally causing degradation of thermal stability. An amount of saturation magnetization in the process of writing a signal is preferably not larger than 100 emu/cm$^3$, and more preferably is not larger than 20 emu/cm$^3$. An excessively large thickness, even in the case of small saturation magnetization, makes the magnetic property of exchange coupling control layer 42 to appear in practice. Thus, a thin film is desirable, preferably not larger than 5 nm, and more preferably not larger than 3 nm. In addition to the above-described properties, a value of the crystalline magnetic anisotropy constant Ku is at least 10$^6$ erg/cm$^3$ at the room temperature, at which the layer is in a state of retaining a signal. This condition contributes to improve thermal stability at the room temperature.

Protective layer 50 can employ a conventionally used protective layer, for example, a protective layer mainly composed of carbon. In addition to a single layer, lamination structures are possible composed of, for example, two carbon layers of different properties, a metal film and a carbon film, and an oxide film and a carbon film.

The following describes some examples of methods for manufacturing a perpendicular magnetic recording medium according to the invention. The examples are only representatives for appropriately describing a manufacturing method for a magnetic recording medium of the invention, and not intended to limit the invention.

EXAMPLES

Example 1

A glass substrate with a disk shape having a smooth surface was used for nonmagnetic substrate 10. After cleaning, the substrate was introduced into a sputtering apparatus and a CoNbZr film 80 nm thick was deposited using a $Co_{88}Nb_7Zr_5$ target under an argon gas pressure of 5 mtorr, to form soft magnetic backing layer 20 of CoNbZr. Subsequently, Ru underlayer 30 having a thickness of 20 nm was deposited using a Ru target under an argon gas pressure of 30 mtorr. After that, magnetic layer 41 of CoPtCr—$SiO_2$ with a thickness of 8 nm was formed using a target of $(Co_{75}Pt_{20}Cr_5)_{94}$—$(SiO_2)_6$ under an argon gas pressure of 60 mtorr; subsequently, exchange coupling control layer 42 of a NiCr—$SiO_2$ layer 1 nm thick was formed using a target of $(Ni_{94}Cr_6)_{94}$—$(SiO_2)_6$ under an argon gas pressure of 30 mtorr; and then, magnetic layer 43 of CoCrPt—$SiO_2$ with a thickness of 8 nm was formed using a target of $(Co_{75}Cr_{20}Pt_5)_{94}$—$(SiO_2)_6$ under an argon gas pressure of 60 mtorr. Thus, magnetic recording layer 40 composed of CoPtCr—$SiO_2$/NiCr—$SiO_2$/CoCrPt—$SiO_2$ layers was formed. Then, protective layer 50 of carbon 4 nm thick was deposited by a CVD method, and the substrate was removed from the vacuum apparatus. After that, a liquid lubricant layer of perfluoropolyether 2 nm thick was formed by a dip-coating method. Thus, a magnetic recording medium was fabricated. A sputtering method in this manufacturing process was the RF magnetron sputtering method for deposition of the magnetic layers (41, 43) and the DC magnetron sputtering method for deposition of the other layers.

Comparative Example 1

A magnetic recording medium was fabricated in the same manner as in Example 1 except that exchange coupling control layer 42 of NiCr—$SiO_2$ was not formed.

Comparative Example 2

A magnetic recording medium was fabricated in the same manner as in Example 1 except that a thickness of exchange coupling control layer 42 of NiCr—$SiO_2$ was changed to 8 nm.

Comparative Example 3

A magnetic recording medium was fabricated in the same manner as in Example 1 except that exchange coupling control layer 42 was formed of a CoCr—$SiO_2$ layer, in place of the NiCr—$SiO_2$ layer, using a target of $(Co_{95}Cr_5)_{94}$—$(SiO_2)_6$.

Comparative Example 4

A magnetic recording medium was fabricated in the same manner as in Example 1 except that exchange coupling control layer 42 was formed of a TbFe layer, in place of the NiCr—$SiO_2$ layer, using a TbFe target.

Comparative Example 5

A magnetic recording medium was fabricated in the same manner as in Example 1 except that exchange coupling control layer 42 was formed of a Ru—$SiO_2$ layer 0.20 nm thick, in place of the NiCr—$SiO_2$ layer, using a target of $Ru_{94}$—$(SiO_2)_6$.

Evaluation 1

In order to grasp basic properties of the magnetic layers (41, 43) and exchange coupling control layers 42 used in the Examples and Comparative Examples, evaluations were made for the crystal structure and magnetic properties of a single layer of each of the magnetic layers and the exchange coupling control layers. The results are described below. The layer structure was substrate/tantalum/ruthenium/magnetic layer or exchange coupling control layer. A thickness of the magnetic layer or the exchange coupling control layer was 20 nm. Evaluation of the crystal structure was performed using an X-ray diffraction apparatus; evaluation of the magnetic properties was conducted using a VSM (vibrating sample magnetometer). For the magnetic layer of $(Co_{75}Pt_{20}Cr_5)_{94}$—$(SiO_2)_6$, the crystal structure was hcp, and the saturation magnetization at 200° C. was 568 emu/cm$^3$; for the magnetic layer of $(Co_{75}Cr_{20}Pt_5)_{94}$—$(SiO_2)_6$, the crystal structure was hcp, and the saturation magnetization at 200° C. was 393 emu/cm$^3$. Results for the exchange coupling control layers are summarized in Table 1.

Next, results of performance evaluation on the perpendicular media of Example and Comparative Examples will be described. Table 2 shows the results for magnetic properties and electromagnetic conversion characteristics of the Example and Comparative Examples. Evaluation for magnetic property (coercivity) was performed using a Kerr effect measuring apparatus capable of temperature dependence measurement. Evaluations for electromagnetic conversion characteristics, signal-to-noise ratio (SNR) and overwrite performance (OW), were conducted by a spinning stand tester installing a laser spot heating mechanism and using a GMR head (giant magnetoresistance head). Laser power was adjusted to obtain a recording layer temperature of 200° C.; and turned ON upon recording or overwriting, and turned OFF upon reading out. The GMR head used was for a recording track width of 140 nm and a reproduction track width of 90 nm.

Example 1, as compared with Comparative Examples, exhibited the greatest reduction rate of the coercivity from the room temperature to 200° C., and the highest SNR value, which is an indicator of recording density. The GMR head used in the present measurement is known to have sufficient writing capability at an OW value not smaller than 35 [−dB], which corresponds to a medium coercivity of lower than about 4.5 [kOe]. Consequently, the recording in Example 1 was performed in a condition where the coercivity had been sufficiently reduced to a value for writing process by heating. Thus, a favorable SNR value was attained by making good use of ability of the medium.

Comparative Example 1, in contrast, exhibited a coercivity in the heated condition of a high value of 5.9 [kOe]. A resulted OW value was much smaller than 35 [−dB], which inhibited saturation recording and deteriorated the SNR significantly. Since a coercivity at room temperature is equivalent for Comparative Example 1 and Example 1, a recording density capability of the medium is also equivalent. Nevertheless, the ability of the medium of Comparative Example 1 is not sufficiently utilized.

Comparative Example 2 exhibited a coercivity at room temperature much smaller than Example 1. This occurred because magnetic properties of the exchange coupling control layer 42 significantly affected the whole recording layers and greatly deteriorated the recording density capability of the medium. This deterioration can be attributed to a larger thickness of exchange coupling control layer 42 than that in Example 1 and a large amount of total magnetization. As a result, despite an OW value of 45 [−dB] showing a sufficient writing ability, SNR was a very poor value of 9.3 [dB].

Comparative Example 3 showed a smaller reduction of coercivity by heating than Example 1, and an insufficient OW and poor SNR. These characteristics are similar to those in Comparative Example 1, which does not have exchange coupling control layer 42. As shown in Table 1, the saturation magnetization in the heated condition is larger than that of magnetic layer 43. The exchange coupling between the magnetic layers (41, 43) is so strong even in the heated condition that the reduction of coercivity is similar to the case without exchange coupling control layer 42. Seeing from the reversed side, the effects of Example 1 have been made clear in which the exchange coupling energy between the magnetic layers is weakened by heating.

Comparative Example 4 exhibited a much smaller coercivity at room temperature than Example 1. This is caused by deterioration of the microstructure of magnetic layer 43 disposed on exchange coupling control layer 42. The crystal structure of Comparative Example 4 is an amorphous structure and thus differs from Example 1 and Comparative Examples 1, 2, 3, and 5. The amorphous crystal structure interrupts epitaxial growth of hcp/hcp, hcp/fcc, or fcc/hcp from underlayer 30. The resulting magnetic layer 43 on exchange coupling control layer 42 is degraded in crystal alignment, and at the same time, in the separation structure between magnetic grains and nonmagnetic substance, which means degradation of recording density performance of the medium. Reflecting this degradation, Comparative Example 4 exhibited a very small SNR value despite a relatively high OW value.

Comparative Example 5 exhibited a smaller coercivity at room temperature than Example 1. This was not caused by degradation in recording density performance of the medium as in Comparative Example 2 and Comparative Example 4, but resulted from a moderate decrease in the exchange coupling energy between the upper and lower magnetic layers (41, 43), creating a coercivity reduction effect. The effect is also shown by the larger SNR value than those in Comparative Examples 2 and 4. The SNR value, however, is smaller than that in Example 1, which is caused by the large coercivity at 200° C., degrading OW and write performance. When nonmagnetic exchange coupling control layer 42 is employed, the exchange coupling energy J scarcely varies with temperature rise, and reduction in coercivity originates only from material property change, that is, decrease in the Ku value of the upper and lower magnetic layers. Comparing this result, the effect of Example 1 is apparent where the exchange coupling energy varies with temperature.

Example 2

This is an example in which a crystalline magnetic anisotropy constant of the exchange coupling control layer was changed. A magnetic recording medium was fabricated in the same manner as in Example 1 except that Co—TiO$_2$ layers 0.3 nm thick and Pd layers 0.4 nm thick were alternately deposited five times using a Co—TiO$_2$ target and a Pd target to obtain a lamination of [Co—TiO$_2$/Pd]$_5$ in place of the NiCr—SiO$_2$ layer.

Evaluation 2

Thermal stability was compared between Example 1, Example 2, and Comparative Example 5. Using a spinning stand tester as described previously, signals were written at 100 kFCI under a heated condition at 200° C., and decay of the output signals were evaluated. The results were: −0.003 (%/decade-sec) for Example 1, −0.0001 (%/decade-sec) for Example 2, and −0.02 (%/decade-sec) for Example 5. Thermal stability was highest in Example 2, second highest in Example 1, and third highest in Comparative Example 5. These results can be attributed to contribution from thermal stability of the exchange coupling control layer. Evaluation of the Ku values of the exchange coupling control layer resulted in: 0.6×10$^6$ erg/cm$^3$ for Example 1, 2.3×10$^6$ erg/cm$^3$ for Example 2, and zero for Comparative Example 5, which corresponds to the degree of thermal stability. Example 2 exhibited an SNR of 15.0 [−dB] and an OW of 39.6 [dB], which were approximately the same values as for Example 1.

As described thus far, according to the embodiment of the invention, large variation of magnetic properties with temperature variation has been attained in a magnetic recording layer having a micro structure including magnetic grains surrounded by a nonmagnetic substance, which structure is advantageous for high recording density. Thus, a magnetic recording medium capable of high density recording has been provided that can be used in magnetic recording devices in which a process of writing a signal is conducted at a higher temperature than in a state of retaining a signal.

TABLE 1

Exchange Coupling Control Layers in Example and Comparative Examples

| material | | thickness [nm] | crystal structure | saturation magnetization at 200° C. [emu/cm3] |
|---|---|---|---|---|
| Example 1 | (Ni94Cr6)94(SiO2)6 | 1 | fcc | 20 |
| Comp Ex 1 | none | — | — | — |
| Comp Ex 2 | (Ni94Cr6)94(SiO2)6 | 8 | fcc | 21 |
| Comp Ex 3 | (Co95Cr5)94(SiO2)6 | 1 | hcp | 523 |
| Comp Ex 4 | TbFe | 1 | amorphous | 18 |
| Comp Ex 5 | Ru94(SiO2)6 | 0.2 | hcp | 0 |

TABLE 2

Evaluation Results on Example and Comparative Examples

| | Coercivity [kOe] | | SNR | OW |
|---|---|---|---|---|
| | Room Temperature | 200° C. | [dB] | [−dB] |
| Example 1 | 9.0 | 3.7 | 15.1 | 40.1 |
| Comp Ex 1 | 9.1 | 5.9 | 12.1 | 21.6 |
| Comp Ex 2 | 4.2 | 2.1 | 9.3 | 45.0 |
| Comp Ex 3 | 9.3 | 6.1 | 11.9 | 20.1 |
| Comp Ex 4 | 4.8 | 4.4 | 7.9 | 38.2 |
| Comp Ex 5 | 7.2 | 4.9 | 13.5 | 32.3 |

Thus, a magnetic recording medium has been described according to the present invention. Many modifications and variations may be made to the techniques and structures described and illustrated herein without departing from the spirit and scope of the invention. Accordingly, it should be understood that the media described herein are illustrative only and are not limiting upon the scope of the invention.

This application is based on and claims priority to Japanese Patent Application 2007-245760, filed on 21 Sep. 2007. The disclosure of the priority application in its entirety, including the drawings, claims, and the specification thereof, is incorporated herein by reference.

| Description of Symbols | |
|---|---|
| 10: | nonmagnetic substrate |
| 20: | soft magnetic backing layer |
| 30: | underlayer |
| 40: | magnetic recording layer |
| 41, 43: | magnetic layer |
| 4A: | magnetic portion |
| 4B: | nonmagnetic portion |
| 42: | exchange coupling control layer |
| 50: | protective layer |

[Patent Document 1]
Japanese Unexamined Patent Application Publication No. 2005-310368
[Non-patent Document 1]
J. Magn. Soc. Jpn., 31, 178 (2007)
[Non-patent Document 2]
Technical Report of IECE, MR2004-39 (2004)

What is claimed is:

1. A magnetic recording medium for use in a magnetic recording device in which a process of writing a signal is conducted at a temperature higher than a temperature in a state retaining a signal, comprising:
   an underlayer,
   a magnetic recording layer, and
   a protective layer sequentially laminated on a nonmagnetic substrate;
   the magnetic recording layer having two magnetic layers and an exchange coupling control layer inserted between the magnetic layers, the two magnetic layers being magnetically coupled through the exchange coupling control layer, wherein a coupling energy of the two magnetic layers and the exchange coupling control layer in the process of writing a signal and a coupling energy of the two magnetic layers and the exchange coupling control layer in the state of retaining a signal are different from each other, and the coupling energy Jw in the process of writing a signal and the coupling energy Jr in the state of retaining a signal satisfy a relation $0<Jw<Jr$,
   wherein the exchange coupling control layer contains a magnetic element and a saturation magnetization $M_{se}$ of the exchange coupling control layer and saturation magnetizations $M_{s1}$ and $M_{s2}$ of the magnetic layers disposed on and beneath the exchange coupling control layer in the process of writing a signal satisfy inequalities $M_{se}<M_{s1}$ and $M_{se}<M_{s2}$, and
   wherein a crystalline magnetic anisotropy constant Ku of the exchange coupling control layer is at least $1.0 \times 10^6$ erg/cm$^3$.

2. The magnetic recording medium according to claim 1, wherein the magnetic layers and the exchange coupling control layer each includes a structure in which magnetic crystal grains are surrounded by a nonmagnetic substance.

3. The magnetic recording medium according to claim 1, wherein the exchange coupling control layer is composed of multilayered laminated layers of a film including a magnetic element(s) and a nonmagnetic material(s) of oxide or nitride added to the magnetic element, and a film of a nonmagnetic material.

* * * * *